United States Patent [19]

Jordan

[11] Patent Number: 5,724,867
[45] Date of Patent: Mar. 10, 1998

[54] AIRBOAT TRANSMISSION

[76] Inventor: W. Bishop Jordan, 245 Quayside Cir., Maitland, Fla. 32751

[21] Appl. No.: 535,767

[22] Filed: Sep. 28, 1995

[51] Int. Cl.$^6$ .................................................. F16H 1/22
[52] U.S. Cl. .................................................. 74/665 K
[58] Field of Search .................... 74/665 F, 665 G, 74/665 GA, 665 K

[56] References Cited

U.S. PATENT DOCUMENTS

| | | | |
|---|---|---|---|
| 2,185,545 | 1/1940 | Egan | 74/665 K |
| 2,216,013 | 9/1940 | Kenney | 74/665 K |
| 2,222,102 | 11/1940 | Johnson | 74/665 K |
| 2,347,906 | 5/1944 | Hatcher | 74/665 K |
| 2,516,078 | 7/1950 | Schmitter | 74/665 K |
| 3,244,024 | 4/1966 | Flowers | 74/665 K |

*Primary Examiner*—Dirk Wright
*Attorney, Agent, or Firm*—Allen, Dyer, Doppelt, Milbrath & Gilchrist, P.A.

[57] ABSTRACT

A gear-based airboat transmission is provided for driving a pair of coaxial, counter-rotating propellers. A drive shaft couplable to an engine crank shaft extends rearward into the transmission case, and a pair of coaxial hollow driven shafts extend rearward out of the transmission case, to which are attachable a pair of propellers. A first gear train, containing an even number of gears, reverses the rotational direction of the engine; a second gear train, containing an odd number of gears, retains the rotational direction of the engine. Improved stability characteristics are imparted by supporting the drive shaft at two points within the case and also by positioning the drive and the driven shafts in vertical alignment. The adaptability of the gear-based transmission to being coupled with an automobile engine confers improved noise and efficiency characteristics.

11 Claims, 4 Drawing Sheets

AIRBOAT TRANSMISSION

BACKGROUND OF THE INVENTION

1. Field of the Invention

The present invention relates to airboat propulsion mechanisms and, more particularly, to gear-based transmissions for airboats.

2. Description of Related Art

Airboats are often driven over land and water at high speeds. Airboats typically have employed aircraft engines operating at approximately 2500–3000 revolutions per minute (rpm) connected to solid direct-drive shafts, which rotate a single propeller. Aircraft engines are extremely expensive, and it is a general practice therefore to mount a used aircraft engine to an airboat to save on costs.

The steering apparatus of an airboat usually comprises a pair of rudders, with trim tabs added to correct for the torque that results from the rotation of the propeller, this torque tending to keep the boat from maintaining a level attitude.

Extreme gyroscopic forces can occur when airboats are turned rapidly, and these forces are borne, among other structures, by the driven shaft.

Current airboat systems utilize belt-driven transmissions, which are inefficient owing to power losses caused by belt friction, especially at higher rotational velocities. Belt breakage in these systems is a source of failure. Another disadvantage of belt-driven systems is their inability to permit reduction of engine speed, since the shaft used to effect such a reduction would have to be too small to be practicable. Thus it would be advantageous to utilize a different transmission method in an airboat to enable engine speed reduction without loss of efficiency.

Propeller breakage is also a major source of failure, since at 3000 rpm extremely high forces are experienced at the propeller hub. It would therefore be desirable to reduce the load on the propeller.

It has been taught by Becker et al. (U.S. Pat. No. 4,932,280, dated Jun. 12, 1990) to use coaxial drive shaft systems for driving multiple outputs from a single input in an aircraft. Gearing means are disclosed for driving two outputs at different speeds.

SUMMARY OF THE INVENTION

It is an object of the present invention to provide an airboat transmission that has improved strength and stability characteristics for driving a pair of counter-rotating propellers.

It is a further object to provide such an airboat transmission having a single input shaft for driving both gear trains that in turn drive the two output driven shafts.

It is another object to provide an airboat transmission for driving coaxial counter-rotating propellers that is drivable at variable speeds.

It is an additional object to provide such an airboat transmission with which it is possible to drive the counter-rotating propellers at different speeds to provide additional thrust and reduce noise output.

These and other objects are achieved by the airboat transmission of the present invention, which is for driving a pair of coaxial, counter-rotating propellers. The transmission generally is housed in a case that has an interior space.

A drive shaft extends from the outside of the case into the interior space and is rotatable in a first direction. When the transmission is in use on an airboat, the drive shaft is mated at one end to a motor crank extending from and rotated by an engine. As mentioned above, previously known airboats utilized aircraft-type engines; however, with the transmission of the present invention, it has been found that an automobile engine can be used. This has a benefit of reducing cost, as well as other benefits to be discussed below.

A first hollow driven shaft also extends into the interior space of the case, typically from a side opposite that of the drive shaft. The first hollow driven shaft is for rotating an outer propeller, that is, the propeller farther from the airboat body.

A second hollow driven shaft likewise extends into the interior space of the case and is further positioned in surrounding, generally coaxial arrangement to the first hollow driven shaft. The second driven shaft is shorter than the first, and both ends protrude beyond the ends of the first driven shaft. This second driven shaft is for rotating an inner propeller, that is, the propeller closer to the airboat body.

A first gear train for driving the first hollow shaft is housed in the interior space of the case. In its simplest configuration, the first drive train comprises two gears: a drive gear and a first driven gear. The drive gear is coaxially affixed to the drive shaft. The first driven gear is coaxially affixed to the first hollow shaft in such a position and configured so as to be rotatable by the drive gear. Thus, when the drive shaft rotates in the first direction, the drive gear is rotated in the first direction. This causes the first driven gear to be rotated in a second direction opposite in sense to the first direction, which consequently drives the first hollow shaft in the second direction.

In an alternate embodiment, additional intermediate driven gears may be interposed between the drive gear and the first driven gear, so long as the total number of intermediate gears is an even number.

A second gear train is also housed in the interior space of the case. This second gear train also includes the drive gear. In an alternate embodiment the drive gear may comprise a pair of drive gears, one for driving the first gear train and one for driving the second gear train.

There are two driven gears in the second gear train: A second driven gear is affixed to the case and is axially spaced from the first driven gear. The second driven gear is positioned and configured so as to be rotatable by the drive gear. The third driven gear is also axially spaced from the first driven gear and is coaxially affixed to the second hollow shaft, positioned and configured so as to be rotatable by the second driven gear. Thus in use when the drive shaft rotates in the first direction, the drive gear is rotated in the first direction, the second driven gear is rotated in the second direction, the third driven gear is rotated in the first direction, and the second hollow shaft is rotated in the first direction.

Thus it can be seen that the rotation of the drive shaft in one direction achieves, through the action of the two gear trains, a counter-rotation of the two coaxial hollow driven shafts and thus imparts counter-rotation to propellers attached thereto.

Using a gear-driven transmission permits driving an automobile engine at the point of maximum horsepower, which generally implies a motor crank rotational speed approximately in the range of 5000–5200 rpm, and then gearing down the rotational speed to roughly 2500–2800, a quieter speed at which to run the propellers.

The invention is not, of course, limited to the use of an automobile engine; in fact, the presence of the gear trains enables the user to optimize for efficiency and noise characteristics by altering gear ratios as desired.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figures 1A, 1B:
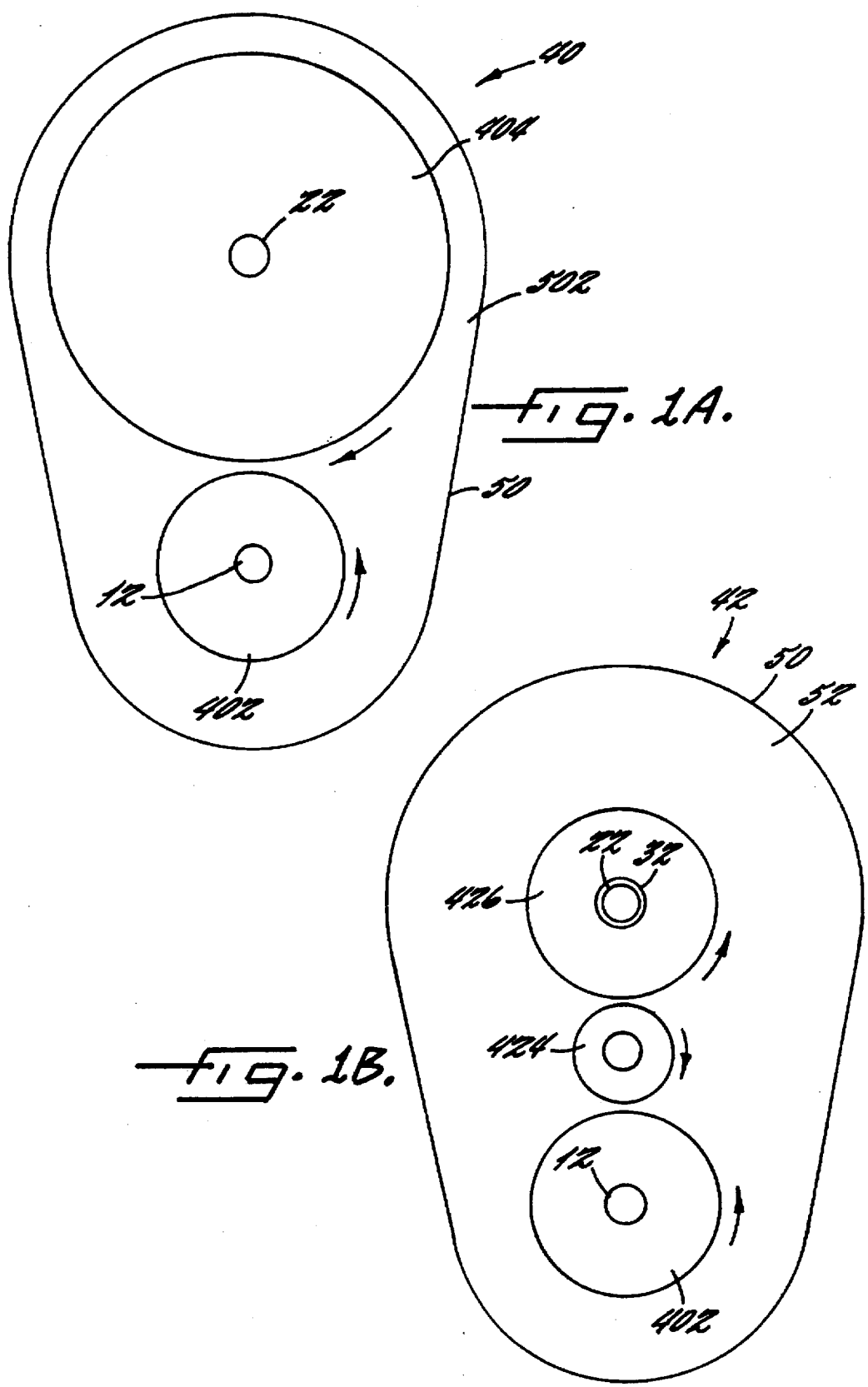
FIG. 1 illustrates a rear view of a first embodiment of the airboat transmission gears for driving the (a) inner and (b) outer driven shaft.
Figure 2A:
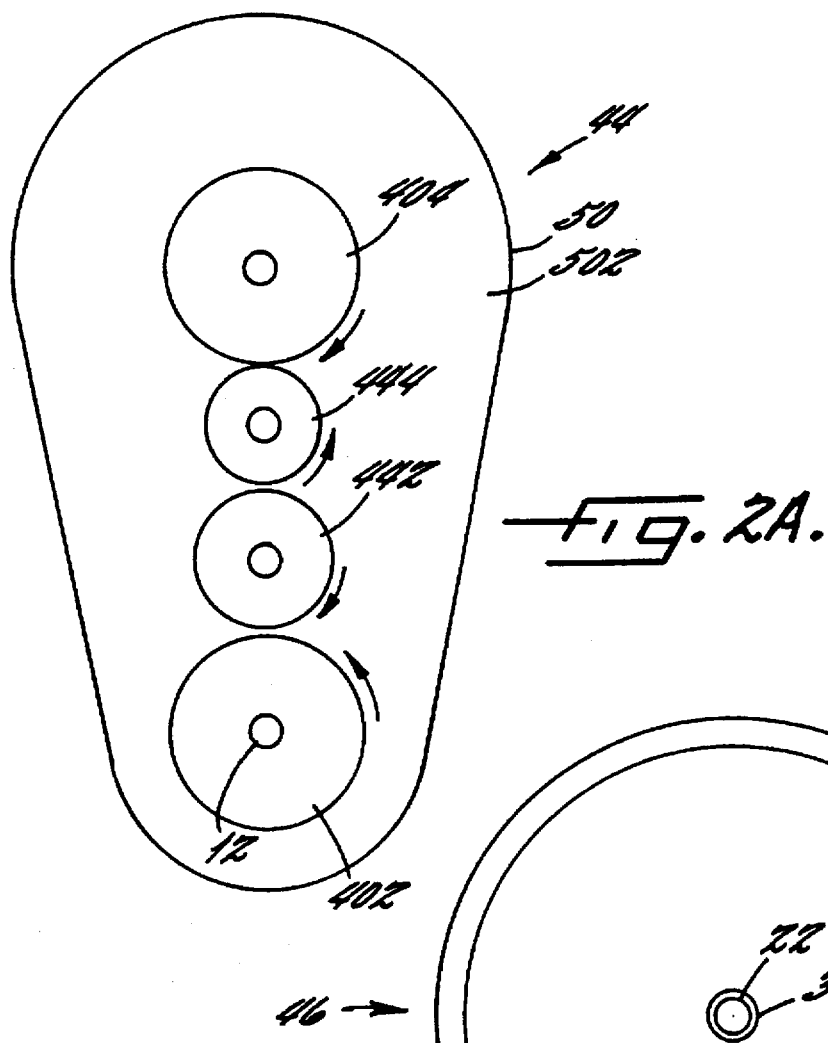
FIG. 2 illustrates a rear view of a second embodiment of the airboat transmission gears for driving the (a) inner and (b) outer driven shaft.
Figure 2B:
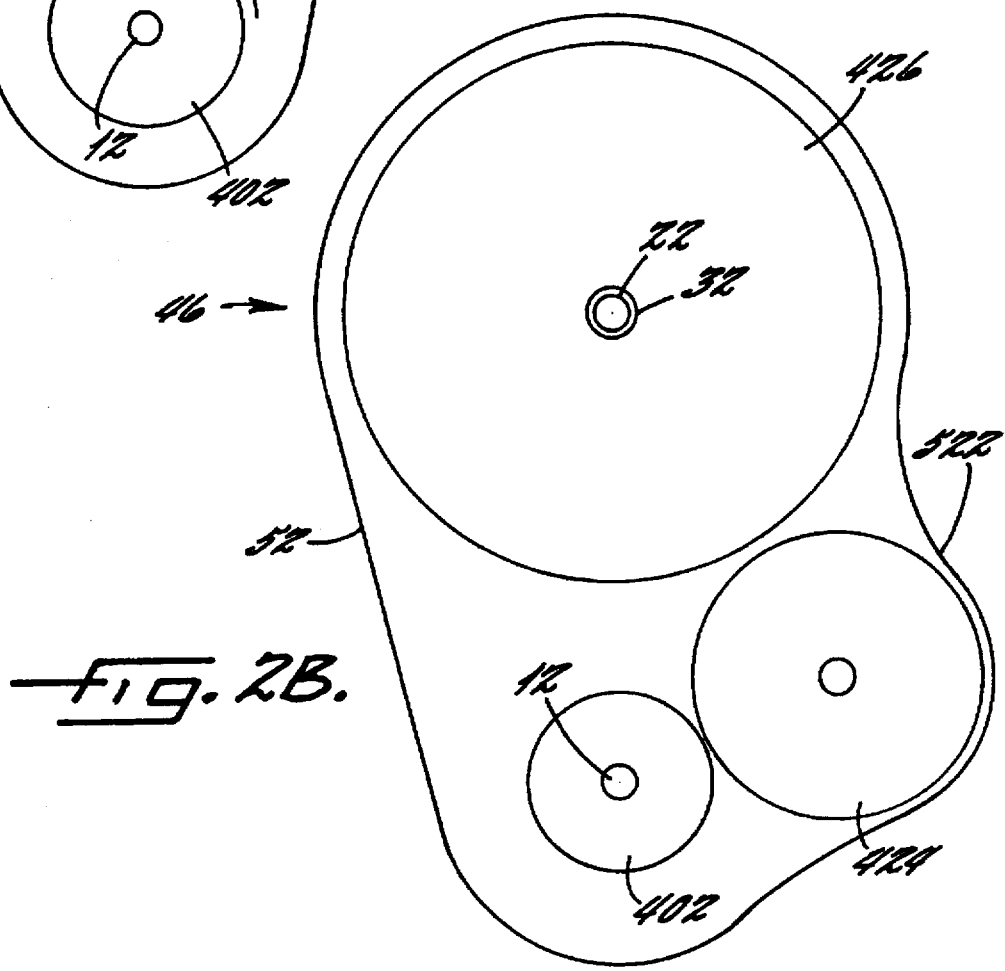
Figure 3A:
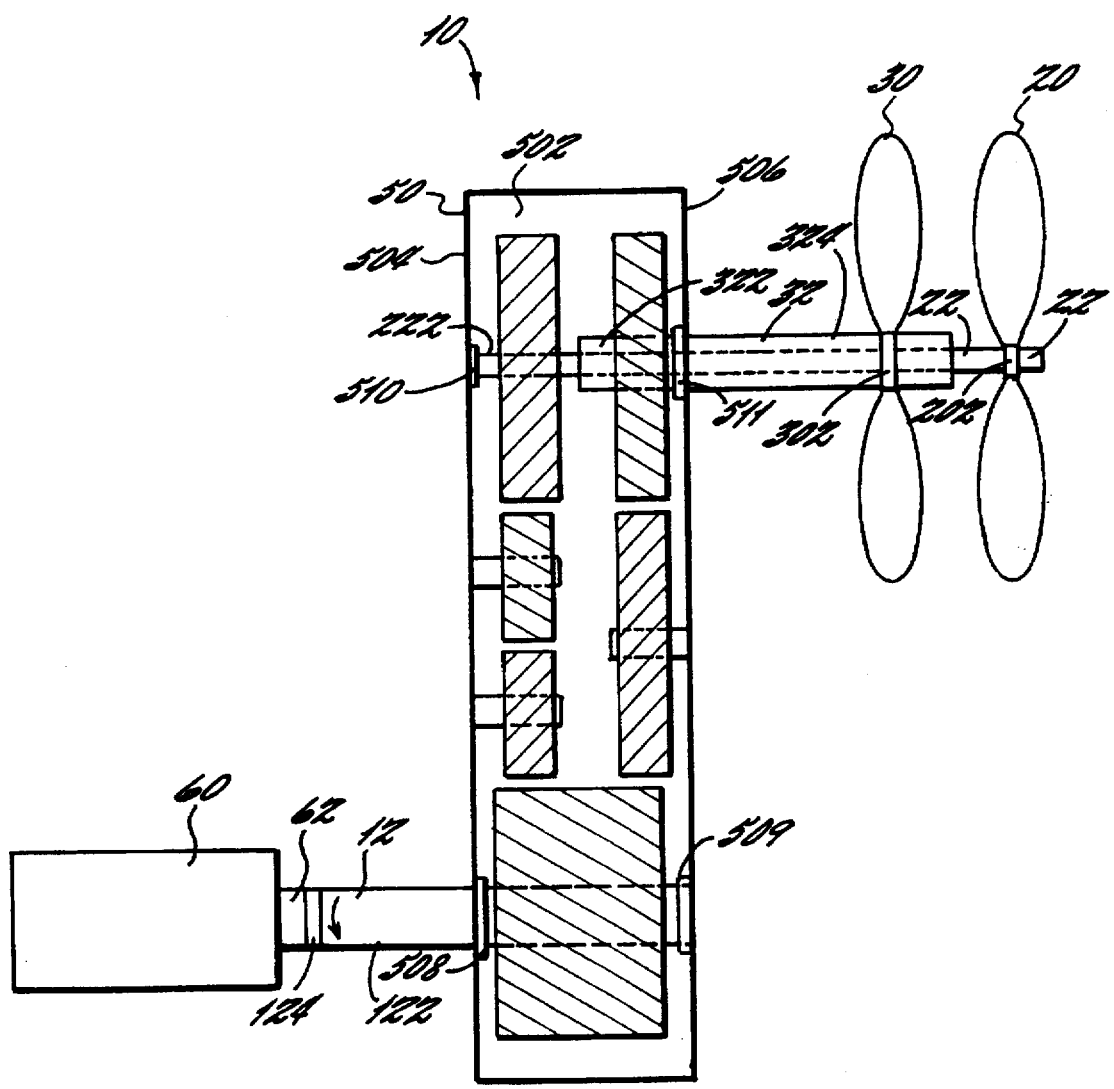
FIG. 3 is a side cross-sectional view of the embodiment of FIG. 2, also showing other components of the system, having (a) a single drive gear and (b) a dual drive gear.

A description of the preferred embodiments of the present invention will now be presented with reference to FIGS. 1–3.

The airboat transmission 10 of the present invention, shown from the side in FIG. 3, which is designed to drive a pair of coaxial, counter-rotating propellers 20 and 30, comprises a case 50 that has an interior space 502, a front side 504, and a back side 506. Depending upon the configuration of the gear trains, which will be discussed in the following, the shape of the case 50 as seen from the back may be symmetrical, as in FIG. 1(b), or asymmetrical, as in FIG. 2(b). (Here "from the back" is taken to means a view from the propeller side toward the engine side.) It is preferred that the case exterior be aerodynamically shaped in order to confer good airflow characteristics to the transmission 10 during use at high speeds.

A drive shaft 12 extends into the interior space 502 of the case 50 through the case's front side 504. The drive shaft 12 is rotatable in a first direction, shown here as counterclockwise when viewed from the front. Typically the drive shaft's proximal portion 122, which extends outside the case 50, contains a coupler 124 for mating with the crank shaft 62 from the airboat engine 60, which generates the rotational motion. The drive shaft 12 is preferably configured as a through shaft with respect to the case 50, and is thus supportable via brackets 508,509 affixed on the inside of both the front 504 and the back 506 sides, respectively, of the case interior space 502. This dual support confers exceptional stability to the drive shaft 12.

The outer propeller 20 is mounted via propeller mount 202 to the distal portion 224 of, and is rotated by, a first hollow driven shaft 22 that extends from the back side 506 into the interior space 502 of the case 50. The proximal end 222 of the outer propeller 20 is supported via bracketing 510 on the inside of the case's front side 504.

The inner propeller 30 is mounted via propeller mount 302 to the distal portion 324 of, and is rotated by, a second hollow driven shaft 32 that extends from the back side 506 into the interior space 502 of the case 50. The second hollow shaft 32 is positioned in surrounding, generally coaxial arrangement to the first hollow driven shaft 20 and is shorter than the first driven shaft 22. These relative lengths permit the proximal end 222 and the distal portion 224 of the first driven shaft 22 to protrude, respectively, beyond the proximal end 322 and the distal portion 324 of the second driven shaft 32. The second driven shaft 32 is supported on the interior of the case's back side 506 by bracketing 511.

In a preferred embodiment, as shown in FIGS. 1 and 2, the longitudinal axes of the drive shaft 12 and the first 22 and second 32 hollow driven shafts are positioned generally in vertical alignment. This positioning confers improved stability during use, as the gyroscopic forces balance in this configuration.

The airboat transmission 10 of the present invention further comprises two gear trains housed within the case 50, one for driving each of the hollow driven shafts 22,32. The first gear train 40 comprises an even number of gears for changing the incoming rotational direction. The embodiment shown in FIG. 1(a) contains two gears: a drive gear 402 coaxially affixed to the drive shaft 12 and a first driven gear 404 coaxially affixed to the first hollow shaft 22. The first driven gear 404 is positioned and configured so as to be rotatable by the drive gear 402. Thus, when the drive shaft 12 rotates in the first direction, here shown as counterclockwise, the drive gear 402 is rotated in the same direction, and the first driven gear 404 is rotated in a second direction opposite in sense to the first direction, that is, clockwise. Thus the first hollow shaft 22 is driven in a clockwise direction also, as would be an attached propeller 20.

The second gear train 42 comprises an odd number of gears for maintaining the incoming rotational direction. The second gear train 42 comprises the drive gear 402, a second driven gear 424, and a third driven gear 426. The second 424 driven gear is rotatably affixed to the front side 504 of the case 50 and is axially spaced from the first driven gear 404. The second driven gear 424 is positioned and configured so as to be rotatable by the drive gear 402, and the third driven gear 426, which is coaxially affixed to the second hollow shaft 32, is positioned and configured so as to be rotatable by the second driven gear 424. Therefore, in use, when the drive shaft 12 rotates in the first direction, the drive gear 402 is rotated in the first direction, the second driven gear 424 is rotated in the second direction, the third driven gear 426 is rotated in the first direction, and the second hollow shaft 32 is rotated in the first direction, conferring counter-rotational movement to the inner propeller 30 with respect to the outer propeller 20.

In an alternate embodiment 46 of the second gear train, the axis of rotation of second driven gear 424 is not aligned with those of the drive gear 402 and the third driven gear 426. In this embodiment the case 52 has an asymmetric cross-sectional shape, with a bulge 522 needed to accommodate the second driven gear 424.

In an alternate embodiment 44 of the first gear train, shown in FIG. 2(a), two intermediate driven gears are provided. Both the fourth 442 and the fifth 444 driven gears are rotatably affixed to the inside of the front side 504 of the case 50 and are axially spaced from the second 424 and the third 426 driven gears. The fourth driven gear 442 is positioned and configured so as to be rotatable by the drive gear 402, and the fifth driven gear 444 is positioned and configured so as to be rotatable by the fourth driven gear 442 and to rotate the first driven gear 404.

In this embodiment the first driven gear 404 is rotatable by the drive gear 402 via intermediate rotations of the fourth 442 and the fifth 444 driven gears.

Figure 3B:
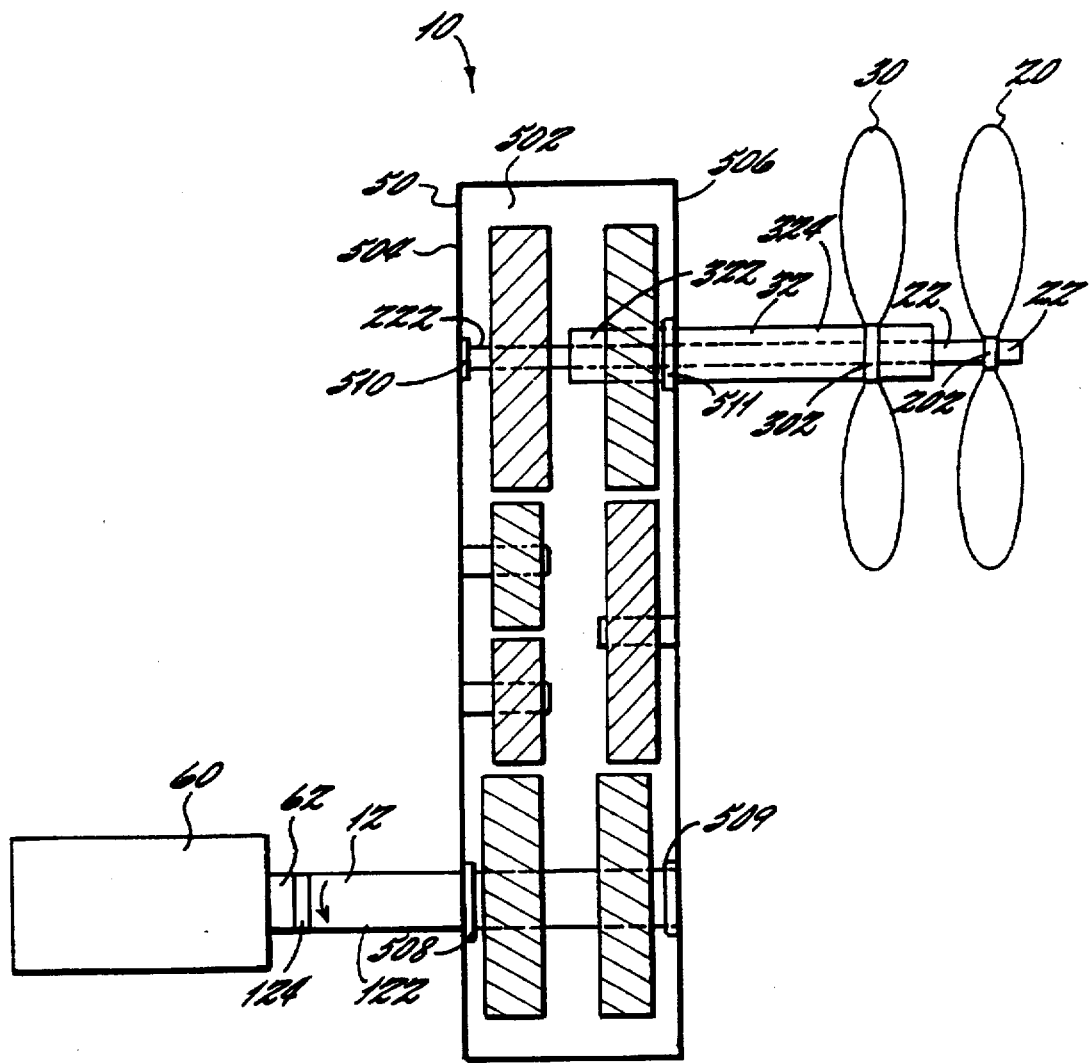

In another embodiment of the transmission 14, the drive gear [see FIG. 3(b)] comprises a first drive gear 406 and a second drive gear 408 axially separated therefrom. Both are coaxially affixed to the drive shaft 12. The first drive gear 406 is positioned and configured so as to be in rotating relationship with the first driven gear 404; the second drive gear 408 is positioned and configured so as to be in rotating relationship with the second driven gear 424.

In any of the above-detailed embodiments it may be seen that the first and the second gear trains can be adapted to drive the propellers at different speeds, which has been shown to provide improved thrust characteristics and reduced noise.

It may be appreciated by one skilled in the art that additional embodiments may be contemplated, including variable numbers and sizes of gears, which may be positioned and configured to permit variable relative speeds of the two counter-rotating propellers.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. An airboat transmission for driving a pair of coaxial, counter-rotating propellers, the transmission comprising:

a case having an interior space;

a drive shaft extending into the interior space of the case and rotatable in a first direction;

a first hollow driven shaft extending into the interior space of the case affixable for rotation to an outer propeller of an airboat;

a second hollow driven shaft extending into the interior space of the case and positioned in surrounding, generally coaxial arrangement to the first hollow driven shaft, the second driven shaft shorter than the first driven shaft, the second driven shaft affixable for rotation to an inner propeller of the airboat;

a first gear train housed in the interior space of the case comprising:

a drive gear coaxially affixed to the drive shaft; and a first driven gear coaxially affixed to the first hollow shaft, the first driven gear rotatable by the drive gear, wherein when the drive shaft rotates in the first direction, the drive gear is rotated in the first direction, the first driven gear is rotated in a second direction opposite in sense to the first direction, and the first hollow shaft is driven in the second direction; and a second gear train housed in the interior space of the case comprising:

the drive gear;

a second driven gear rotatably affixed to the case and axially spaced from the first driven gear, the second driven gear rotatable by the drive gear; and a third driven gear axially spaced from the first driven gear and coaxially affixed to the second hollow shaft, the third driven gear rotatable by the second driven gear, wherein when the drive shaft rotates in the first direction, the drive gear thereby rotated in the first direction, the second driven gear is rotated in the second direction, the third driven gear is rotated in the first direction, and the second hollow shaft is rotated in the first direction;

wherein the first and the second gear trains permit an optimization of efficiency, and a use of counter-rotating propellers confers improved strength and stability characteristics to the airboat.

2. The airboat transmission recited in claim 1, wherein the first gear train further comprises:

a fourth driven gear rotatably affixed to the case and axially spaced from the second and the third driven gear, the fourth driven gear rotatable by the drive gear; and a fifth driven gear rotatably affixed to the case and axially spaced from the second and the third driven gear, the fifth driven gear rotatable by the fourth driven gear and positioned to rotate the first driven gear;

wherein the first driven gear is rotatable by the drive gear via intermediate rotations of the fourth and the fifth driven gears.

3. The airboat transmission recited in claim 1, wherein the shaft axes of the drive shaft and the first and the second hollow driven shafts are positioned generally in vertical alignment for improving stability during use.

4. The airboat transmission recited in claim 1, wherein the drive gear comprises a first drive gear and a second drive gear axially separated therefrom, the first drive gear in rotating relationship with the first driven gear, the second drive gear in rotating relationship with the second driven gear.

5. The airboat transmission recited in claim 1, further comprising:

means for rotatably supporting the drive shaft within the interior space of the case; and means for rotatably supporting the first and the second hollow driven shafts within the interior space of the case.

6. The airboat transmission recited in claim 5, wherein the means for supporting the drive shaft comprises a pair of support means affixed to the interior of the case, a first support means affixed to a front side of the case and a second support means affixed to a back side of the case.

7. The airboat transmission recited in claim 5, wherein the drive shaft has a proximal portion extending outside the case having means for coupling with a motor crank.

8. The airboat transmission recited in claim 7, wherein:

the second hollow driven shaft has a distal portion extending outside the case having means for mounting a propeller thereon; and the first hollow driven shaft has a distal portion extending outside the case and beyond the second hollow driven shaft distal portion having means for mounting a propeller thereon.

9. An airboat transmission for interfacing with a motor crank of an automobile engine for driving a pair of coaxial, counter-rotating propellers, the transmission comprising:

a case having an interior space;

a drive shaft matable with the automobile engine motor crank, the drive shaft extending into the interior space of the case and rotatable in a first direction;

a first hollow driven shaft extending into the interior space of the case affixable for rotation to an outer propeller of an airboat;

a second hollow driven shaft extending into the interior space of the case and positioned in surrounding, generally coaxial arrangement to the first hollow driven shaft, the second driven shaft shorter than the first driven shaft, the second driven shaft affixable for rotation to an inner propeller of an airboat;

a first gear train housed in the interior space of the case comprising:
  a drive gear coaxially affixed to the drive shaft; and
  a first driven gear coaxially affixed to the first hollow shaft, the first driven gear rotatable by the drive gear, wherein when the drive shaft rotates in the first direction, the drive gear is rotated in the first direction, the first driven gear is rotated in a second direction opposite in sense to the first direction, and the first hollow shaft is driven in the second direction; and a second gear train housed in the interior space of the case comprising:
  the drive gear;
  a second driven gear rotatably affixed to the case and axially spaced from the first driven gear, the second driven gear rotatable by the drive gear; and
  a third driven gear axially spaced from the first driven gear and coaxially affixed to the second hollow shaft, the third driven gear rotatable by the second driven gear, wherein when the drive shaft rotates in the first direction, the drive gear thereby rotated in the first direction, the second driven gear is rotated in the second direction, the third driven gear is rotated in the first direction, and the second hollow shaft is rotated in the first direction;

wherein the first and the second gear trains and the matability with an automobile engine motor crank permit an optimization of efficiency, and a use of counter-rotating propellers confers improved strength and stability characteristics to the airboat.

10. The airboat transmission recited in claim 9, wherein the first gear train is adapted to drive the first hollow driven shaft at a first rotational speed and the second gear train is adapted to drive the second hollow driven shaft at a second rotational speed different from the first rotational speed for providing improved thrust characteristics and reducing noise.

11. The airboat transmission recited in claim 10, wherein the first and the second gear trains are adapted to convert an automobile engine motor crank rotational speed in the range of approximately 5000 to 5200 revolutions per minute to a first and a second hollow driven shaft rotational speed in the range of approximately 2500 to 2800 revolutions per minute, thereby permitting an operation of the automobile engine generally at an optimal horsepower level.

* * * * *